United States Patent
Nate

(10) Patent No.: US 10,135,358 B2
(45) Date of Patent: Nov. 20, 2018

(54) SWITCHING REGULATOR OPERABLE TO ALTER FEEDBACK BASED ON LOAD

(71) Applicant: Rohm Co., Ltd., Kyoto (JP)

(72) Inventor: Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/370,006

(22) Filed: Dec. 6, 2016

(65) Prior Publication Data
US 2017/0170747 A1 Jun. 15, 2017

(30) Foreign Application Priority Data
Dec. 9, 2015 (JP) .................................. 2015-240511

(51) Int. Cl.
| | |
|---|---|
| H02M 3/156 | (2006.01) |
| H02M 7/06 | (2006.01) |
| H02M 1/08 | (2006.01) |
| H02M 1/00 | (2006.01) |

(52) U.S. Cl.
CPC .............. *H02M 7/06* (2013.01); *H02M 1/08* (2013.01); *H02M 3/156* (2013.01); *H02M 2001/0006* (2013.01); *H02M 2001/0009* (2013.01); *H02M 2001/0025* (2013.01)

(58) Field of Classification Search
CPC . H02M 2001/0025; H02M 2001/0006; H02M 3/156; G05F 1/648
See application file for complete search history.

(56) References Cited

U.S. PATENT DOCUMENTS

| | | | | |
|---|---|---|---|---|
| 2005/0024898 A1* | 2/2005 | Yang | ................. | H02M 3/33507 363/21.12 |
| 2007/0018623 A1* | 1/2007 | Lopata | .................... | G05F 1/575 323/282 |
| 2008/0259654 A1* | 10/2008 | Huynh | .............. | H02M 3/33523 363/21.16 |
| 2010/0027300 A1* | 2/2010 | Fang | ................. | H02M 3/33507 363/21.16 |

FOREIGN PATENT DOCUMENTS

JP          2011-045174          3/2011

* cited by examiner

*Primary Examiner* — Harry Behm
(74) *Attorney, Agent, or Firm* — Fish & Richardson P.C.

(57) ABSTRACT

A switching regulator has: a switching device; a rectifying device having the anode thereof connected to an output terminal from which an output voltage is output; an inductor arranged between the switching device and the output terminal; a controller having an error amplifier configured to produce an error signal commensurate with a difference between a voltage commensurate with the cathode voltage of the rectifying device and a reference voltage, the controller using the cathode voltage of the rectifying device as a supply voltage and turning ON and OFF the switching device according to the cathode voltage of the rectifying device; a monitor configured to monitor a current that flows through the inductor; and a current varier configured to increase, based on the result of monitoring by the monitor, a current that flows through the rectifying device with increase in the current flowing through the inductor.

10 Claims, 11 Drawing Sheets

SWITCHING REGULATOR OPERABLE TO ALTER FEEDBACK BASED ON LOAD

This nonprovisional application claims priority under 35 U.S.C. § 119(a) on Patent Application No. 2015-240511 filed in Japan on Dec. 9, 2015, the entire contents of which are hereby incorporated by reference.

BACKGROUND OF THE INVENTION

1. Field of the Invention

The present invention relates to switching regulators.

2. Description of Related Art

FIG. 13 is a diagram showing one configuration example of a non-isolated switching regulator using a photocoupler.

In the switching regulator shown in FIG. 13, a control circuit is driven by a voltage between VCC and IC_GND, monitors a voltage at monitor point P1, and turns On and OFF a switching device based on the result of the monitoring.

The switching regulator shown in FIG. 13 performs feedback control by directly monitoring the output voltage Vout; this allows, as shown in FIG. 14, the output voltage Vout to remain constant (at a set value) irrespective of the value of the output current Iout. That is, the switching regulator shown in FIG. 13 has high output stability.

However, a photocoupler is a relatively expensive component, and thus the switching regulator shown in FIG. 13 is unsuitable for achieving cost reduction.

Thus, from the perspective of cost reduction, non-isolated switching regulators using no photocoupler have been attracting attention. FIG. 15 is a diagram showing one configuration example of a non-isolated switching regulator using no photocoupler. A switching regulator similar to the switching regulator shown in FIG. 15 is disclosed in JP-A-2011-45174.

In the switching regulator shown in FIG. 15, a control circuit is driven by a voltage between VCC and IC_GND, monitors a voltage at monitor point P2, and turns ON and OFF a switching device based on the result of the monitoring.

The switching regulator shown in FIG. 15 performs feedback control without directly monitoring the output voltage Vout; this causes, as shown in FIG. 16, the output voltage Vout to vary, instead of remaining constant (at a set value), according to the value of the output current Iout. That is, the switching regulator shown in FIG. 15 has low output stability.

Thus, the switching regulator shown in FIG. 15 suffers from two problems. A first problem is that the output voltage Vout becomes high when the load is light, and a second problem is that the output voltage Vout becomes low when the load is heavy.

The first problem can be solved by providing a dummy load to avoid use under a light load. Providing a dummy load, however, poses another problem: increased standby power.

The second problem can be solved by increasing the electrostatic capacitance of a capacitor (an output capacitor C0) connected to the output terminal. Increasing the electrostatic capacitance of the output capacitor C0, however, poses another problem: increased cost of the output capacitor.

SUMMARY OF THE INVENTION

An object of the present invention is to provide a photocoupler-less switching regulator with high output stability.

According to one aspect of what is disclosed herein, a switching regulator includes: a switching device; a rectifying device having the anode thereof connected to an output terminal from which an output voltage is output; and a controller using the cathode voltage of the rectifying device as a supply voltage and turning ON and OFF the switching device according to the cathode voltage of the rectifying device. The controller includes an error amplifier configured to produce an error signal commensurate with the difference between a voltage commensurate with the cathode voltage of the rectifying device and a reference voltage. The switching regulator further includes: a monitor configured to monitor the error signal; and a current varier configured to increase, based on the result of monitoring by the monitor, a current that flows through the rectifying device with increase in the error signal.

According to another aspect of what is disclosed herein, a switching regulator includes: a switching device; a rectifying device having the anode thereof connected to an output terminal from which an output voltage is output; and a controller using the cathode voltage of the rectifying device as a supply voltage and turning ON and OFF the switching device according to the cathode voltage of the rectifying device. The controller includes an error amplifier configured to produce an error signal commensurate with the difference between a voltage commensurate with the cathode voltage of the rectifying device and a reference voltage. The switching regulator further includes: a monitor configured to monitor the cathode voltage of the rectifying device; and a current varier configured to increase, based on the result of monitoring by the monitor, a current that flows through the rectifying device with increase in the cathode voltage of the rectifying device.

According to yet another aspect of what is disclosed herein, a switching regulator includes: a switching device; a rectifying device having the anode thereof connected to an output terminal from which an output voltage is output; and a controller using the cathode voltage of the rectifying device as a supply voltage and turning ON and OFF the switching device according to the cathode voltage of the rectifying device. The controller includes a voltage divider configured to divide the cathode voltage of the rectifying device and an error amplifier configured to produce an error signal commensurate with the difference between a division voltage, which is fed out from the voltage divider, of the cathode voltage of the rectifying device and a reference voltage. The switching regulator further includes: a monitor configured to monitor the division voltage, which is fed out from the voltage divider, of the cathode voltage of the rectifying device; and a current varier configured to increase, based on a result of monitoring by the monitor, a current that flows through the rectifying device with increase in the division voltage of the cathode voltage of the rectifying device.

According to yet another aspect of what is disclosed herein, a switching regulator includes: a switching device; a rectifying device having the anode thereof connected to an output terminal from which an output voltage is output; an inductor arranged between the switching device and the output terminal; and a controller using the cathode voltage of the rectifying device as a supply voltage and turning ON and OFF the switching device according to the cathode voltage of the rectifying device. The controller includes an error amplifier configured to produce an error signal commensurate with the difference between a voltage commensurate with a cathode voltage of the rectifying device and a reference voltage. The switching regulator further includes:

a monitor configured to monitor a current that flows through the inductor; and a current varier configured to increase, based on a result of monitoring by the monitor, a current that flows through the rectifying device with increase in the current that flows through the inductor.

According to one aspect of what is disclosed herein, an electric appliance includes a switching regulator according to any one of the configurations described above.

The significance and effect of the present invention will become clear from the description of embodiments that follows. It should however be understood that the embodiments disclosed herein are merely examples of how the present invention can be implemented, and that the meanings of the terms referring to various elements and features of the present invention are not limited to those in which those terms are used in the following description of embodiments.

DETAILED DESCRIPTION OF PREFERRED EMBODIMENTS

Figure 15:
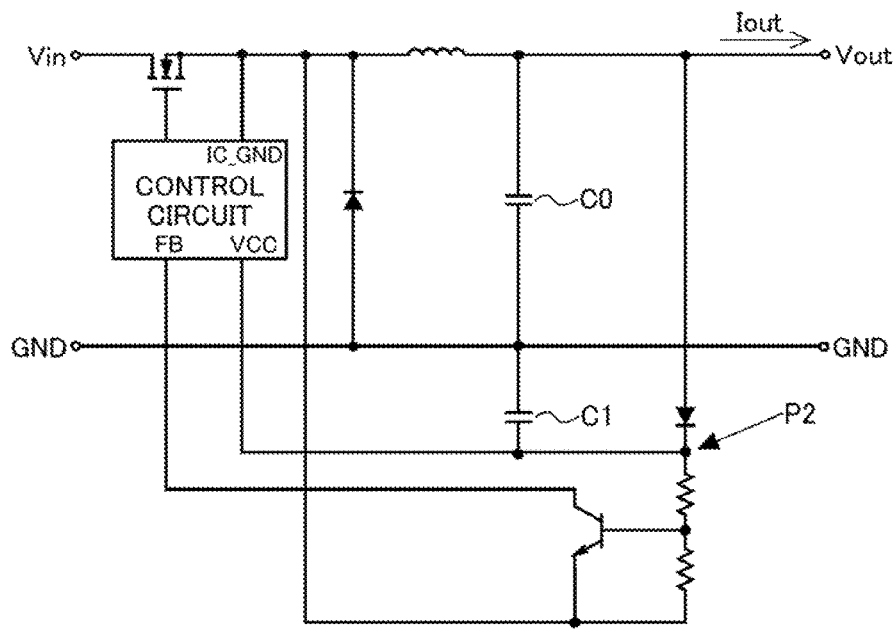
FIG. 15 is a diagram showing one configuration example of a non-isolated switching regulator using no photocoupler.
Figure 16:
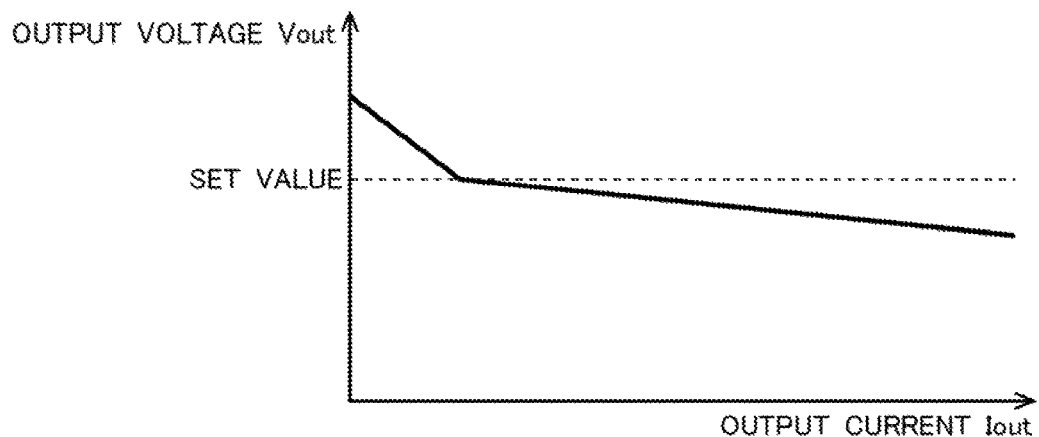
FIG. 16 is a diagram showing the output characteristics of the switching regulator shown in FIG. 15.

Consideration of Switching Regulator Shown in FIG. 15

As described previously the switching regulator shown in FIG. 15, as a result of its performing feedback control without directly monitoring the output voltage Vout, has low output stability. This prompted the present inventor to search for the fundamental cause of low output stability resulting from not directly monitoring the output voltage Vout.

In the switching regulator shown in FIG. 15, a current flows through the feedback passage only when the output voltage Vout is higher than the voltage at monitor point P2 by (the margin of) the forward voltage of the diode connected to monitor point P2. That is, even when the output voltage Vout contains a high ripple voltage, feedback does not function properly except during a period during which the output voltage Vout is higher than the voltage at monitor point P2 by (the margin of) the forward voltage of the diode connected to monitor point P2. This causes low output stability.

In the switching regulator shown in FIG. 15, because of a capacitor being connected to monitor point P2 to stabilize the voltage VCC, even when the output voltage Vout varies, the voltage (voltage VCC) at monitor point P2 remains stable; thus, feedback control proceeds as if the output voltage Vout were stable. Thus, this causes low output stability.

Here the variation $\Delta VCC$ of the voltage VCC is given by formula (1) below. In the formula, $C_{VCC}$ represents the electrostatic capacitance of the capacitor connected to monitor paint P2; $I_{VCC}$ represents a current that is fed from monitor point P2 to the voltage VCC input terminal of the control circuit; and $T_{VCC}$ represents the time taken for the voltage VCC to vary by $\Delta VCC$.

$$C_{VCC} \times \Delta VCC = I_{VCC} \times T_{VCC} \quad (1)$$

On the other hand, the variation $\Delta Vout$ of the output voltage Vout is given by formula (2) below. In the formula, $C_{Vout}$ represents the electrostatic capacitance of the output capacitor, and $T_{Vout}$ represents the time taken for the output voltage Vout to vary by $\Delta Vout$.

$$C_{Vout} \times \Delta Vout = Iout \times T_{Vout} \quad (2)$$

If the equations $\Delta VCC = \Delta Vout$ and $T_{VCC} = T_{Vout}$ hold in the relationship between formulae (1) and (2) and above, the voltage (voltage VCC) at monitor point P2 has variation characteristics similar to those of the output voltage Vout; this leads to high output stability.

To fulfill the equations $\Delta VCC = \Delta Vout$ and $T_{VCC} = T_{Vout}$ in the relationship between formulae (1) and (2) above, it is necessary to fulfill formula (3) below.

$$C_{VCC}/I_{VCC} = C_{Vout}/Iout \quad (3)$$

The output current Iout is a variable that increases with increase in the load, and the electrostatic capacitances $C_{VCC}$ and $C_{Vout}$ are both fixed values. Thus, to fulfill formula (3) above, the current $I_{VCC}$ needs to vary according to the output current Iout. This led the present inventor to invent switching regulators as will be described below as switching regulators that can fulfill formula (3) above.

First Embodiment

Figure 1A:
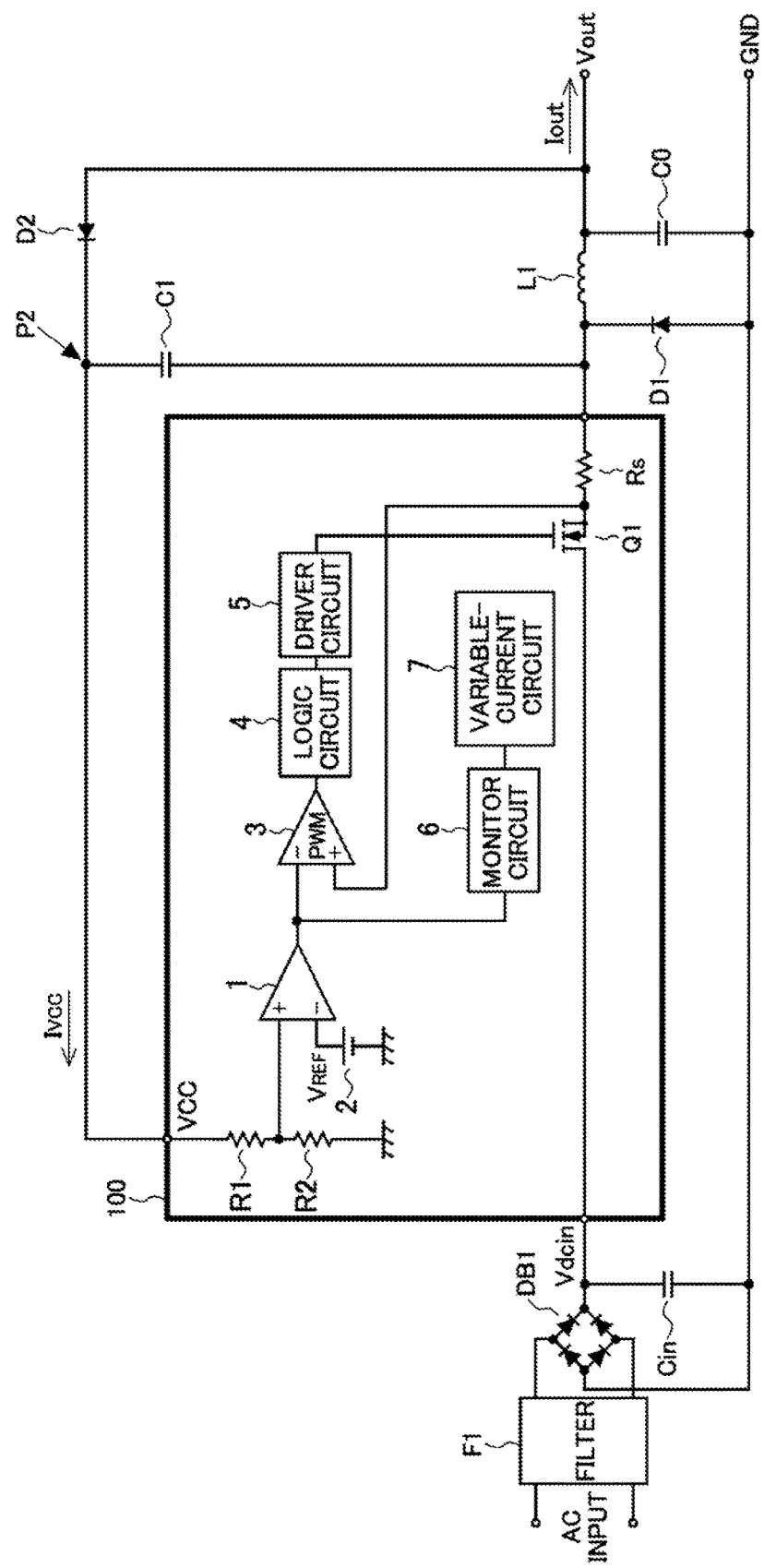
FIG. 1A is a diagram showing an example of an overall configuration of a switching regulator according to a first embodiment.

FIG. 1A is a diagram showing an example of an overall configuration of a switching regulator according to a first embodiment. The switching regulator shown in FIG. 1A is a non-isolated switching regulator using no photocoupler, and includes a filter F1, a diode bridge circuit DB1, an input capacitor Cin, a switching regulator IC 100, a diode D1, an inductor L1, an output capacitor C0, a diode D2, and a capacitor C1.

The switching regulator IC 100 includes voltage division resistors R1 and R2, an error amplifier a reference voltage source 2, a PWM comparator 3, a logic circuit 4, a driver circuit 5, an NMOS transistor Q1, a current detection resistor Rs, a monitor circuit 6, and a variable-current circuit 7.

An AC input voltage undergoes noise elimination by the filter F1, and is then full-wave-rectified by the diode bridge circuit DB1 and smoothed by the input capacitor Cin to be converted into a DC input voltage Vdcin.

When the NMOS transistor Q1 is ON, a voltage (Vdcin−Vout) is applied across the inductor L1. When the NMOS transistor Q1 is turned from ON to OFF, the inductor L1 tends to keep the electric current flowing; this causes the diode D1 to turn ON, and thus the voltage across the inductor L1 becomes equal to (Vout−Vd1). Here, the voltage Vd1 is the forward voltage of the diode D1.

Thus, turning the NMOS transistor Q1 ON and OFF repeatedly produces a pulsating switch voltage. This pulsating switch voltage is smoothed by the output capacitor C0 into an output voltage Vout.

The output voltage Vout is, via the diode D2 for reverse current prevention, stabilized by the capacitor C1 to be converted into a voltage VCC. The switching regulator IC 100 uses the voltage VCC as a supply voltage, and uses the cathode voltage of the diode D1 as a ground potential within the switching regulator IC 100.

The voltage division resistors R1 and R2 produce a division voltage of the voltage VCC. The error amplifier 1 produces an error signal that is commensurate with the difference between the division voltage of the voltage VCC and a reference voltage $V_{REF}$ fed out from the reference voltage source 2.

The PWM comparator 3 produces a FWM signal by comparing the error signal fed out from the error amplifier 1 with a voltage commensurate with the current flowing through the inductor L1 as detected by the current detection resistor Rs. The current detection resistor Rs detects the current flowing through the inductor L1 when the NMOS transistor Q1 is ON.

The logic circuit 4 produces a gate control signal for turning the NMOS transistor Q1 ON and OFF based on the PWM signal fed out from the PWM comparator 3. The driver circuit 5 produces a gate drive signal by amplifying the gate control signal, fed out from the logic circuit 4, and feeds the gate drive signal to the gate of the NMOS transistor Q1.

Figure 2:
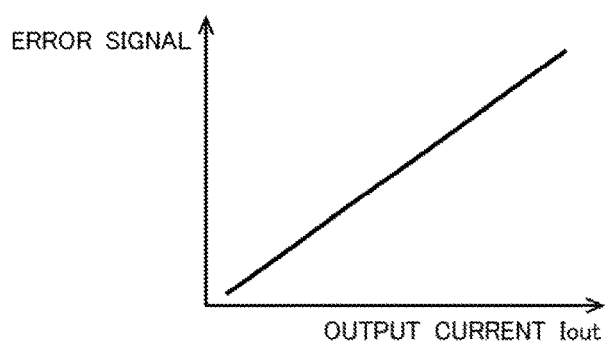
FIG. 2 is a diagram showing the relationship between the output current and an error signal.

In the switching regulator shown in FIG. 1A, as shown in FIG. 2, as the output current Iout increases, the error signal fed out front the error amplifier 1 increases. The switching regulator shown in FIG. 1A exploits this relationship between the output current Iout and the error signal to make, through the operation of the monitor circuit 6 and the variable-current circuit 7, formula (3) above hold.

The monitor circuit 6 monitors the error signal fed out from the error amplifier 1. The variable-current circuit 7 varies a current $I_{VCC}$ (the current fed from the diode D2 to the switching regulator IC 100) according to the result of monitoring by the monitor circuit 6. More specifically, the variable-current circuit 7 increases the current $I_{VCC}$ with increase in the error signal fed from the error amplifier 1. While it is ideal that formula (3) above always holds, as long as the current $I_{VCC}$ varies to be closer in a direction in which formula (3) above holds than when the current $I_{VCC}$ is fixed, the output stability is better than when the current $I_{VCC}$ is fixed. That is, in the switching regulator shown in FIG. 1A, it is not a necessary condition that formula (3) above holds all the time.

Figure 3:
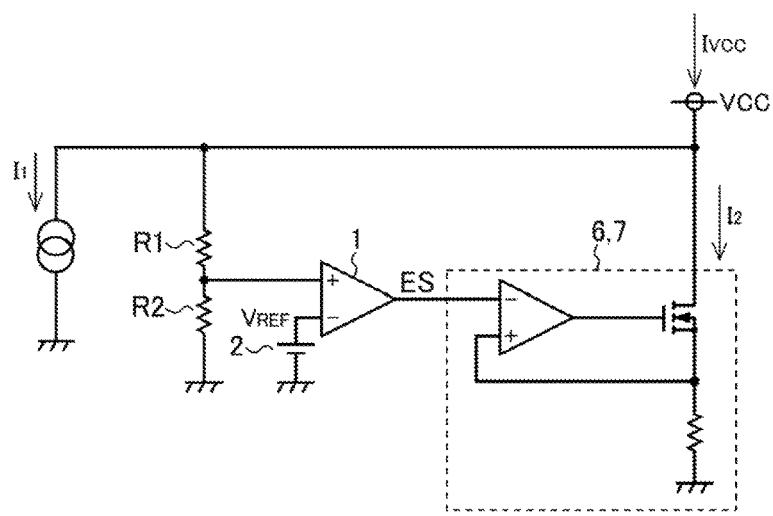
FIG. 3 is a diagram showing one configuration example of a monitor circuit and a variable-current circuit used in the first embodiment.

Next, one configuration example of the monitor circuit 6 and the variable-current circuit 7 used in this embodiment is shown in FIG. 3. In FIG. 3, such components as find their counterparts in FIG. 1A are identified by the same reference signs, and no overlapping description will be repeated.

The monitor circuit 6 and the variable-current circuit 7 of the configuration example shown in FIG. 3 is a V-I conversion circuit composed of an operational amplifier, an NMOS transistor, and a resistor.

Figure 4A:
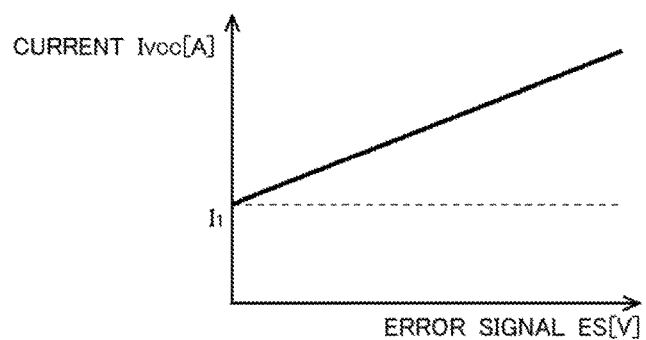
FIG. 4A is a diagram showing the relationship between the error signal and the output current observed when the configuration example in FIG. 3 is adopted.
Figure 4B:
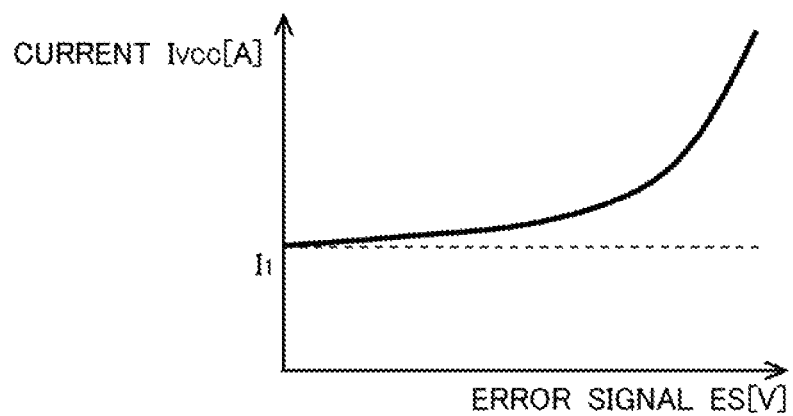
FIG. 4B is a diagram showing the relationship between the error signal and the output current observed when the configuration example in FIG. 3 is adopted.

The V-I conversion circuit extracts a current $I_2$ proportional to the error signal ES, which is an analog voltage signal, from the voltage VCC input terminal of the switching regulator IC 100. The current $I_{VCC}$ equals the sum of a constant current $I_1$ consumed by circuits of the switching regulator IC 100 other than the V-I conversion circuit and the current $I_2$ consumed by the V-I conversion circuit. Thus, through the operation of the V-I conversion circuit, it is possible to increase the current $I_{VCC}$ with increase in the error signal ES (see FIGS. 4A and 4B). For example, as shown in FIG. 4A, it is possible to increase the current $I_{VCC}$ linearly as the error signal ES increases. For another example, as shown in FIG. 4B, it is also possible to increase the current $I_{VCC}$ exponentially as the error signal ES increases.

Figure 5:
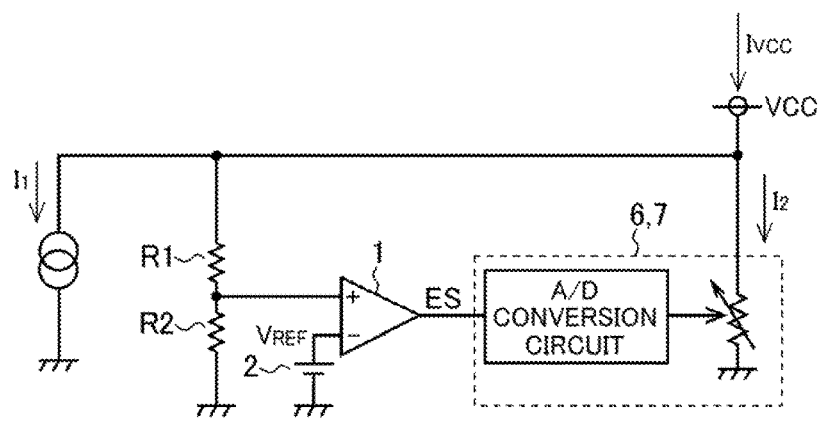
FIG. 5 is a diagram showing another configuration example of the monitor circuit and the variable-current circuit used in the first embodiment.

Next, another configuration example of the monitor circuit 6 and the variable-current circuit 7 used in this embodiment is shown in FIG. 5. In FIG. 5, such components as find their counterparts in FIG. 1A are identified by the same reference signs, and no overlapping description will be repeated.

The monitor circuit 6 and the variable-current circuit 7 of the configuration example shown in FIG. 5 is a V-I conversion circuit composed of an A/D conversion circuit and a variable resistor. The A/D conversion circuit converts the error signal ES, which is an analog voltage signal, into a digital voltage signal with a predetermined sampling period. The variable resistor changes its resistance value according to the digital voltage signal fed out from the A/D conversion circuit. The variable resistor can include, for example, a plurality of resistors connected in series and a plurality of switches arranged in bypass paths provided for the plurality of resistors respectively, and be configured to change the number of switches that are turned ON according to the digital voltage signal fed out from the A/D conversion circuit.

Figure 6:
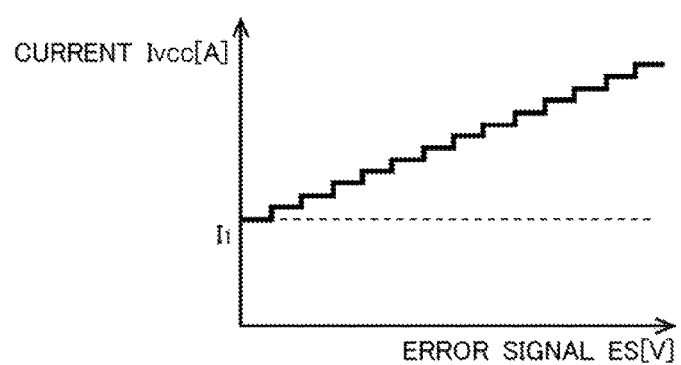
FIG. 6 is a diagram showing the relationship between the error signal and the output current observed when the configuration example in FIG. 5 is adopted.

The V-I conversion circuit extracts a current $I_2$ substantially proportional to the error signal ES, which is an analog voltage signal, from the voltage VCC input terminal of the switching regulator IC 100. The current $I_{VCC}$ equals the sum of a constant current $I_1$ consumed by circuits of the switching regulator IC 100 other than the V-I conversion circuit and the current $I_2$ consumed by the V-I conversion circuit. Thus, through the operation of the V-I conversion circuit, it is possible to increase the current $I_{VCC}$ with increase in the error signal ES (see FIG. 6).

Second Embodiment

Figure 7:
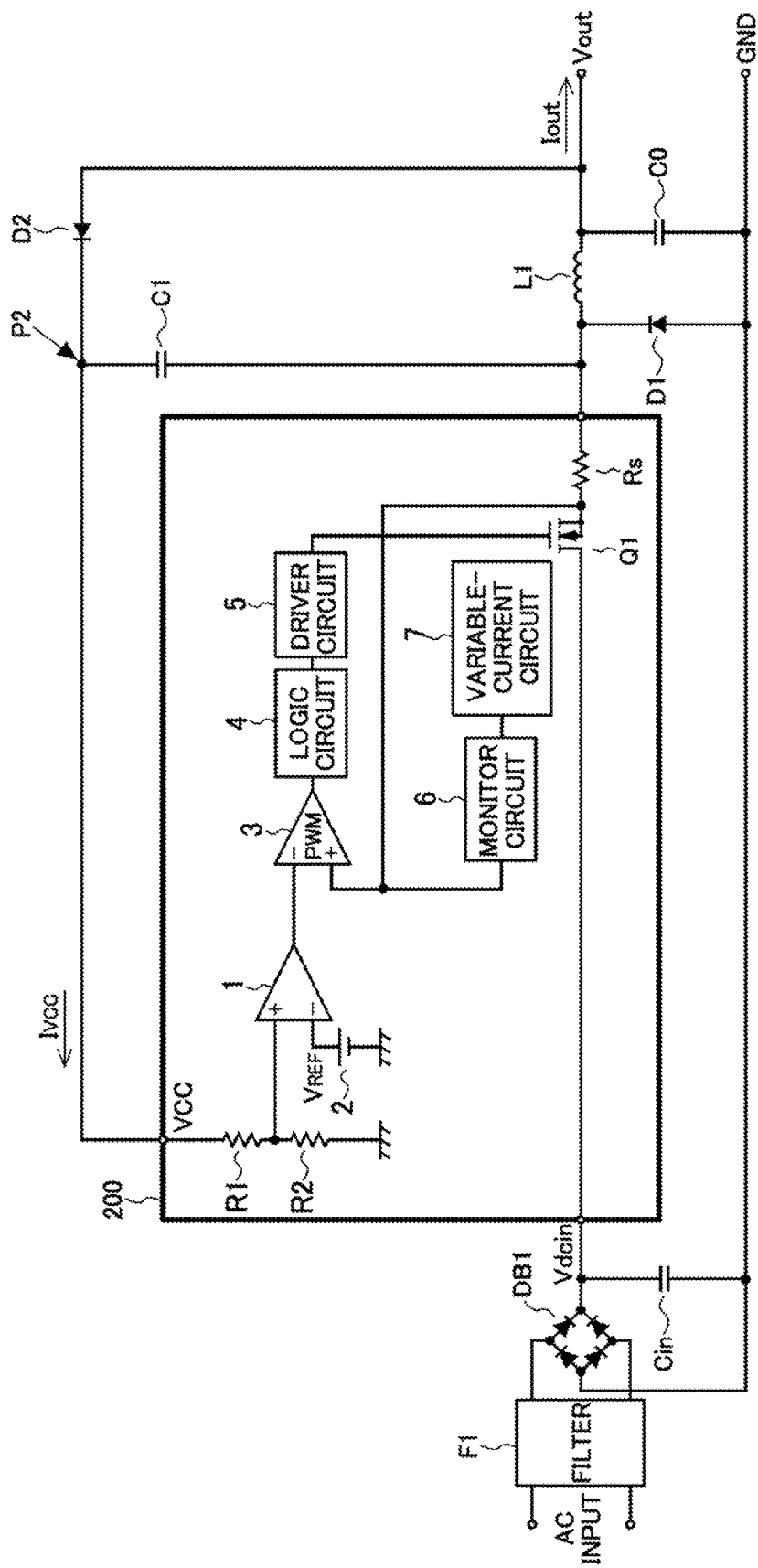
FIG. 7 is a diagram showing an example of an overall configuration of a switching regulator according to a second embodiment of the present invention.

FIG. 7 is a diagram showing an example of an overall configuration of a switching regulator according to a second embodiment of the present invention. In FIG. 7, such components as find their counterparts in FIG. 1A are identified by the same reference signs, and no overlapping description will be repeated.

The switching regulator shown in FIG. 7 differs from the switching regulator shown in FIG. 1A in the target of monitoring by the monitor circuit 6, but is otherwise the same as the switching regulator shown in FIG. 1A. The monitor circuit 6 of the switching regulator shown in FIG. 7 monitors the current that flows through the inductor L1.

In the switching regulator shown in FIG. 7, as the output current Iout increases, the current flowing through the inductor L1 increases. The switching regulator shown in FIG. 7 exploits this relationship between the output current Iout and the current flowing through the inductor L1 to make, through the operation of the monitor circuit 6 and the variable-current circuit 7, formula (3) above hold.

The variable-current circuit 7 varies a current $I_{VCC}$ (the current fed from the diode D2 to the switching regulator IC 100) according to the result of monitoring by the monitor circuit 6. More specifically, the variable-current circuit 7 increases the current $I_{VCC}$ with increase in the current flowing through the inductor L1. While it is ideal that formula (3) above always holds, as on as the current $I_{VCC}$ varies to be closer in a direction in which formula (3) above holds than when the current $I_{VCC}$ is fixed, the output stability is better than when the current $I_{VCC}$ is fixed. That is, in the switching regulator shown in FIG. 7, it is not a necessary condition that formula (3) above holds all the time.

Figure 8:
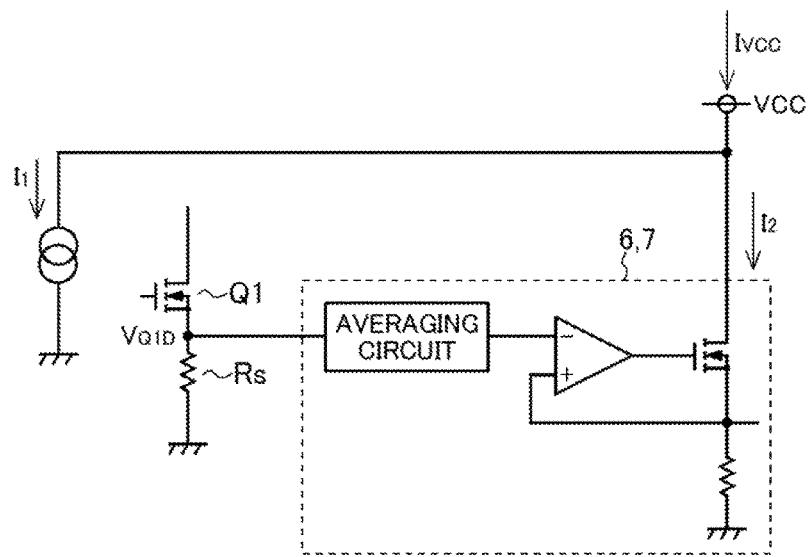
FIG. 8 is a diagram showing one configuration example of a monitor circuit and a variable-current circuit used in the second embodiment.

Next, one configuration example of the monitor circuit 6 and the variable-current circuit 7 used in this embodiment is shown in FIG. 8. In FIG. 8, such components as find their counterparts in FIG. 7 are identified by the same reference signs, and no overlapping description will be repeated.

The monitor circuit 6 and the variable-current circuit 7 of the configuration example shown in FIG. 8 is a V-I conversion circuit composed of an averaging circuit, an operational amplifier, an NMOS transistor, and a resistor.

Figure 9:
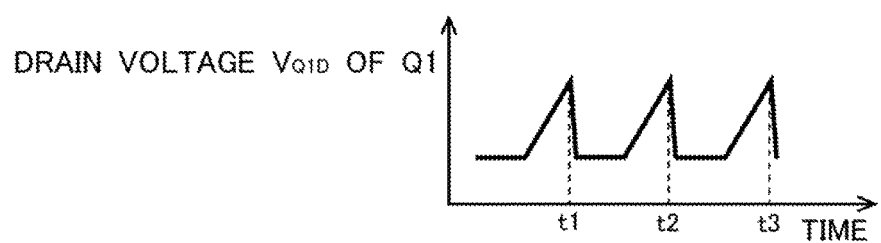
FIG. 9 is a diagram showing the waveform of the drain voltage of an NMOS transistor.

The current detection resistor Rs outputs a voltage commensurate with the current that flows through the inductor L1 when the NMOS transistor Q1 is ON (i.e., the drain voltage of the NMOS transistor Q1) to the averaging circuit. The averaging circuit averages the drain voltage of the NMOS transistor Q1, which varies periodically as shown in FIG. 9, to output it to the operational amplifier.

The V-I conversion circuit extracts a current $I_2$ proportional to the output signal of the averaging circuit, which is an analog voltage signal, from the voltage VCC input terminal of the switching regulator IC 100. The current $I_{VCC}$ equals the sum of a constant current $I_1$ consumed by circuits of the switching regulator IC 100 other than the V-I conversion circuit and the current $I_2$ consumed by the V-I conversion circuit. Thus, through the operation of the V-I conversion circuit, it is possible to increase the current $I_{VCC}$ with increase in the current flowing through the inductor L1.

Figure 10:
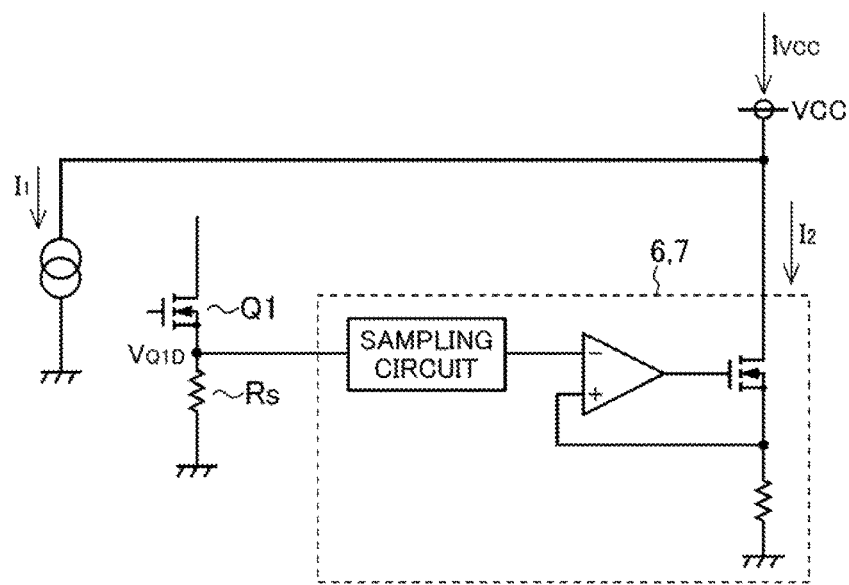
FIG. 10 is a diagram showing another configuration example of the monitor circuit and the variable-current circuit used in the second embodiment.

Next, another configuration example of the monitor circuit 6 and the variable-current circuit 7 used in this embodiment is shown in FIG. 10. In FIG. 10, such components as find their counterparts in FIG. 7 are identified by the same reference signs, and no overlapping description will be repeated.

The monitor circuit 6 and the variable-current circuit 7 of the configuration example shown in FIG. 10 is a V-I conversion circuit composed of a sampling circuit, an operational amplifier, an NMOS transistor, and a resistor.

The current detection resistor Rs outputs a voltage commensurate with the current that flows through the inductor L1 when the NMOS transistor Q1 is ON (i.e., the drain voltage of the NMOS transistor Q1) to the sampling circuit. The sampling circuit samples the drain voltage of the NMOS transistor Q1, which varies periodically as shown in FIG. 9, with a sampling period synchronized with the switching period of the NMOS transistor Q1. The sampling timing of the sampling circuit is, for example as indicated by t1, t2, t3, . . . in FIG. 9.

The V-I conversion circuit extracts a current $I_2$ proportional to the sampling value (an analog voltage signal) of the drain voltage of the NMOS transistor Q1, which is an analog voltage signal, from the voltage VCC input terminal of the switching regulator IC 100. The current $I_{VCC}$ equals the sum of a constant current $I_1$ consumed by circuits of the switching regulator IC 100 other than the V-I conversion circuit and the current $I_2$ consumed by the V-I conversion circuit. Thus, through the operation of the conversion circuit, it is possible to increase the current $I_{VCC}$ with increase in the current flowing through the inductor L1.

Figure 11:
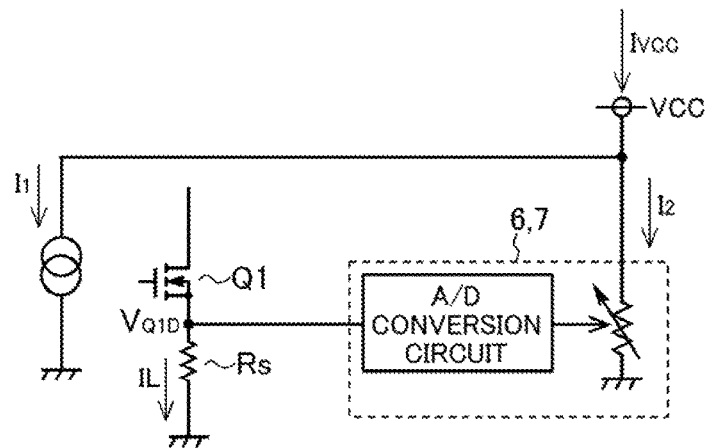
FIG. 11 is a diagram showing yet another configuration example of the monitor circuit and the variable-current circuit used in the second embodiment.

Next, yet another configuration example of the monitor circuit 6 and the variable-current circuit 7 used in this embodiment is shown in FIG. 11. In FIG. 11, such components as find their counterparts in FIG. 7 are identified by the same reference signs, and no overlapping description will be repeated.

The monitor circuit 6 and the variable-current circuit 7 of the configuration example shown in FIG. 11 is a V-I conversion circuit composed of art A/D conversion circuit and a variable resistor.

The current detection resistor Rs outputs a voltage commensurate with the current that flows through the inductor L1 when the NMOS transistor Q1 is ON (i.e., the drain voltage of the NMOS transistor Q1) to the A/D conversion circuit. The A/D conversion circuit converts the drain voltage of the NMOS transistor Q1, which varies periodically as shown in FIG. 9, into a digital voltage signal with a sampling period synchronized with the switching period of the NMOS transistor Q1. The sampling timing of the sampling circuit is, for example, as indicated by t1, t2, t3, . . . in FIG. 9.

The variable resistor changes its resistance value according to the digital voltage signal fed out from the A/D conversion circuit. The variable resistor can include, for example, a plurality of resistors connected in series and a plurality of switches arranged in bypass paths provided for the plurality of resistors respectively, and be configured to change the number of switches that are turned ON according to the digital voltage signal fed out from the A/D conversion circuit.

The V-I conversion circuit extracts a current $I_2$ proportional to the A/D sampling value (a digital voltage signal) of the drain voltage of the NMOS transistor Q1, which is an analog voltage signal, from the voltage VCC input terminal of the switching, regulator IC 100. The current $I_{VCC}$ equals the sum of a constant current $I_1$ consumed by circuits of the switching regulator IC 100 other than the V-I conversion circuit and the current $I_2$ consumed by the V-I conversion circuit. Thus, through the operation of the V-I conversion circuit, it is possible to increase the current $I_{VCC}$ with increase in the current flowing through the inductor L1.

Application

Figure 12:
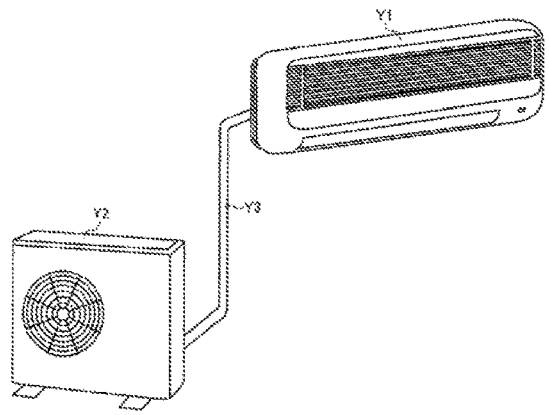
FIG. 12 is an exterior view showing one configuration example of an air conditioner.
Figure 13:
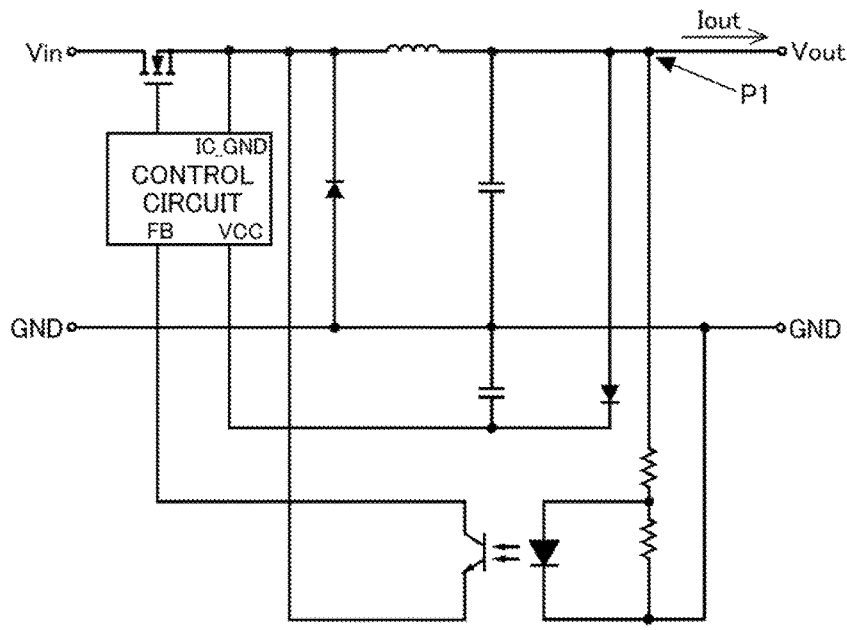
FIG. 13 is a diagram showing one configuration of a non-isolated switching regulator using a photocoupler.
Figure 14:
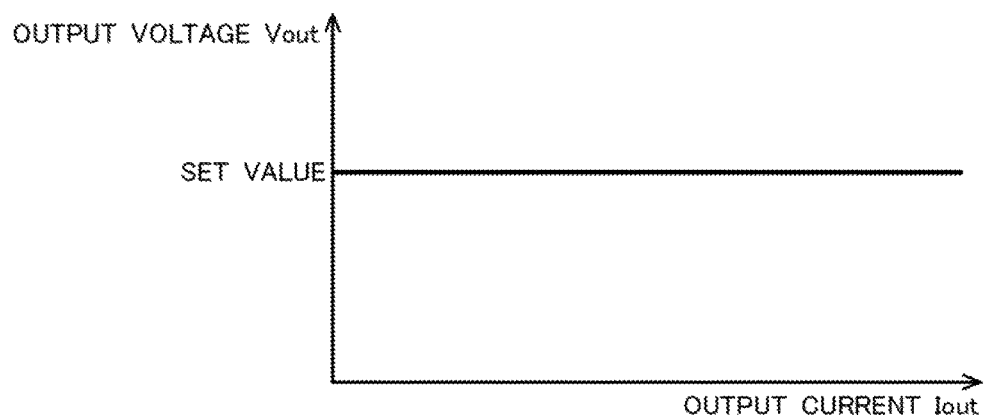
FIG. 14 is a diagram showing the output characteristics of the switching regulator shown in FIG. 13.

Next, a description will be given of an application example of the above-described switching regulators shown in FIGS. 1A and 7. FIG. 12 is an exterior view showing one configuration example of an air conditioner. The air conditioner Y of this configuration example has an indoor unit Y1, an outdoor unit Y2, and a pipe Y3 for connecting these together. The indoor unit Y1 incorporates an evaporator and an indoor fan, and the outdoor unit Y2 incorporates a compressor, a condenser, an expansion valve, an outdoor fan, and the switching regulator shown in FIG. 1A or in FIG. 7.

In cooling operation of the air conditioner Y, first, the compressor of the outdoor unit 12 compresses refrigerant into high-temperature, high-pressure gas, and then the condenser of the outdoor unit Y2 rejects heat to liquefy the refrigerant. Here, the outdoor fan is rotated to blow air onto the condenser to promote heat rejection, and thus hot air blows out from the outdoor unit Y2. Then, the liquefied refrigerant is depressurized by the expansion valve of the outdoor unit Y2 into low-temperature, low-pressure liquid, and is then fed via the pipe Y3 into the indoor unit Y1, where it is evaporated by the evaporator of the indoor unit Y1. Here, the evaporator becomes cold due to the heat of evaporation of the refrigerant; thus, rotating the indoor fan to blow air onto the evaporator causes cold air to be discharged from the indoor unit Y1 into a room. The evaporated refrigerant is fed again via the pipe Y3 into the outdoor unit Y2, and thereafter the same heat exchange process as described above is repeated.

In heating operation of the air conditioner Y, the refrigerant circulates in the reverse direction, and accordingly the roles of the evaporator of the indoor unit Y1 and the condenser of the outdoor unit Y2 are exchanged, but otherwise basically the same heat exchange process as that described above is performed.

In the air conditioner Y of the configuration example, the switching regulator shown in FIG. 1A or in FIG. 7, which has high output stability as described previously, can be suitably used as a power supply for a compressor, which is subject to large load variation.

Other Modifications

The present invention may be implemented in any other manner than in the embodiments specifically described above, and allows for many modifications and variations within the spirit of the invention.

For example, although, in the switching regulators shown in FIGS. 1A and 7, the voltage division resistors R1 and R2, the error amplifier 1, and the reference voltage source 2 are incorporated in the switching regulator IC 100, these components may be provided outside the IC. Likewise, although, in the switching regulators shown in FIGS. 1A and 7, the NMOS transistor Q1 and the current detection resistor Rs are incorporated in the witching regulator IC 100, these components may be provided outside the IC.

For example, although the switching regulators shown in FIGS. 1A and 7 are current-controlled switching regulators in which information on the current flowing through the inductor L is reflected in feedback control, they may be modified to voltage-controlled switching regulators in which no information on the current flowing through the inductor L1 is reflected in feedback control.

Figure 1B:
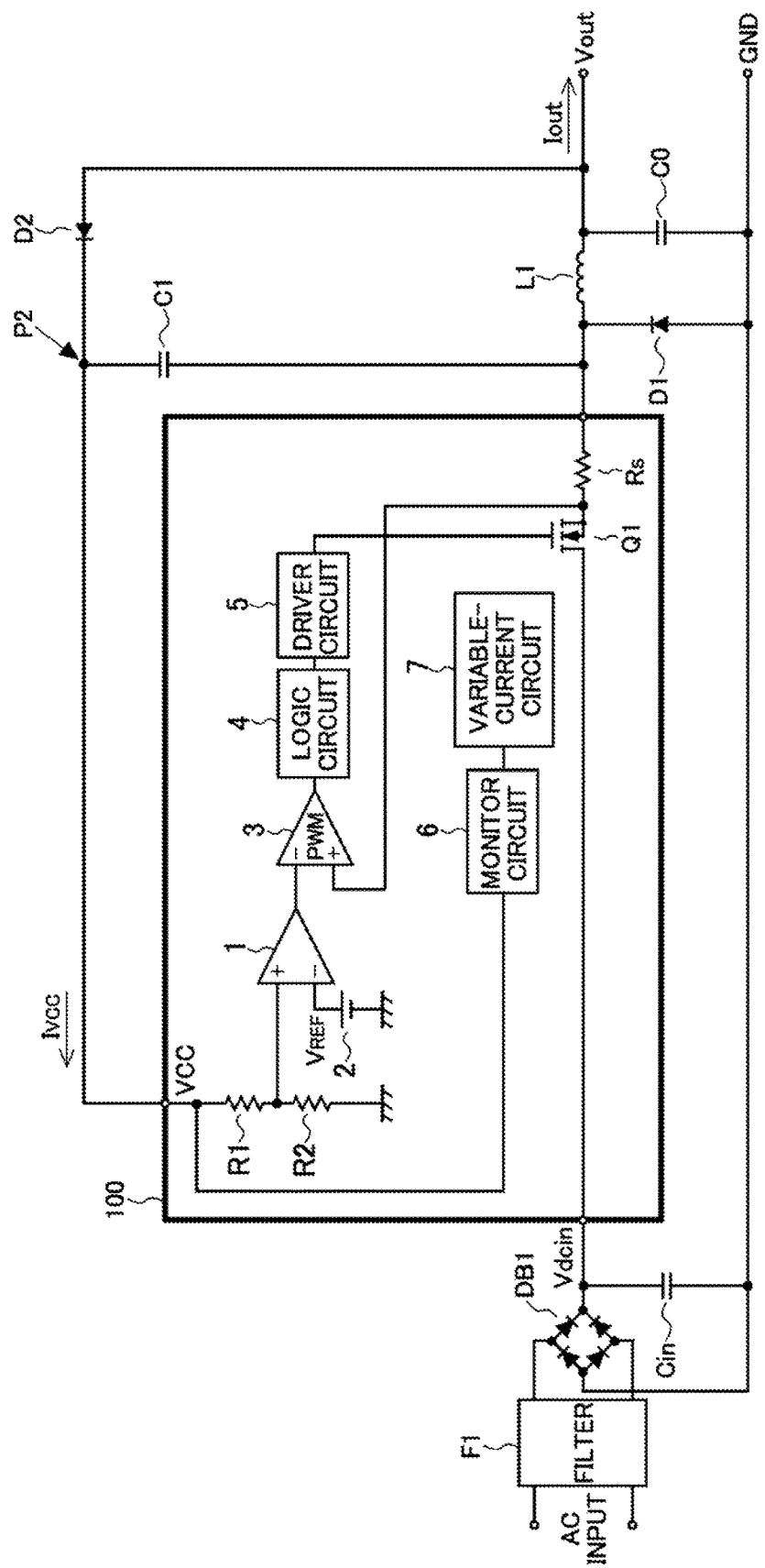
FIG. 1B is a diagram showing a modified example of the switching regulator shown in FIG. 1A.
Figure 1C:
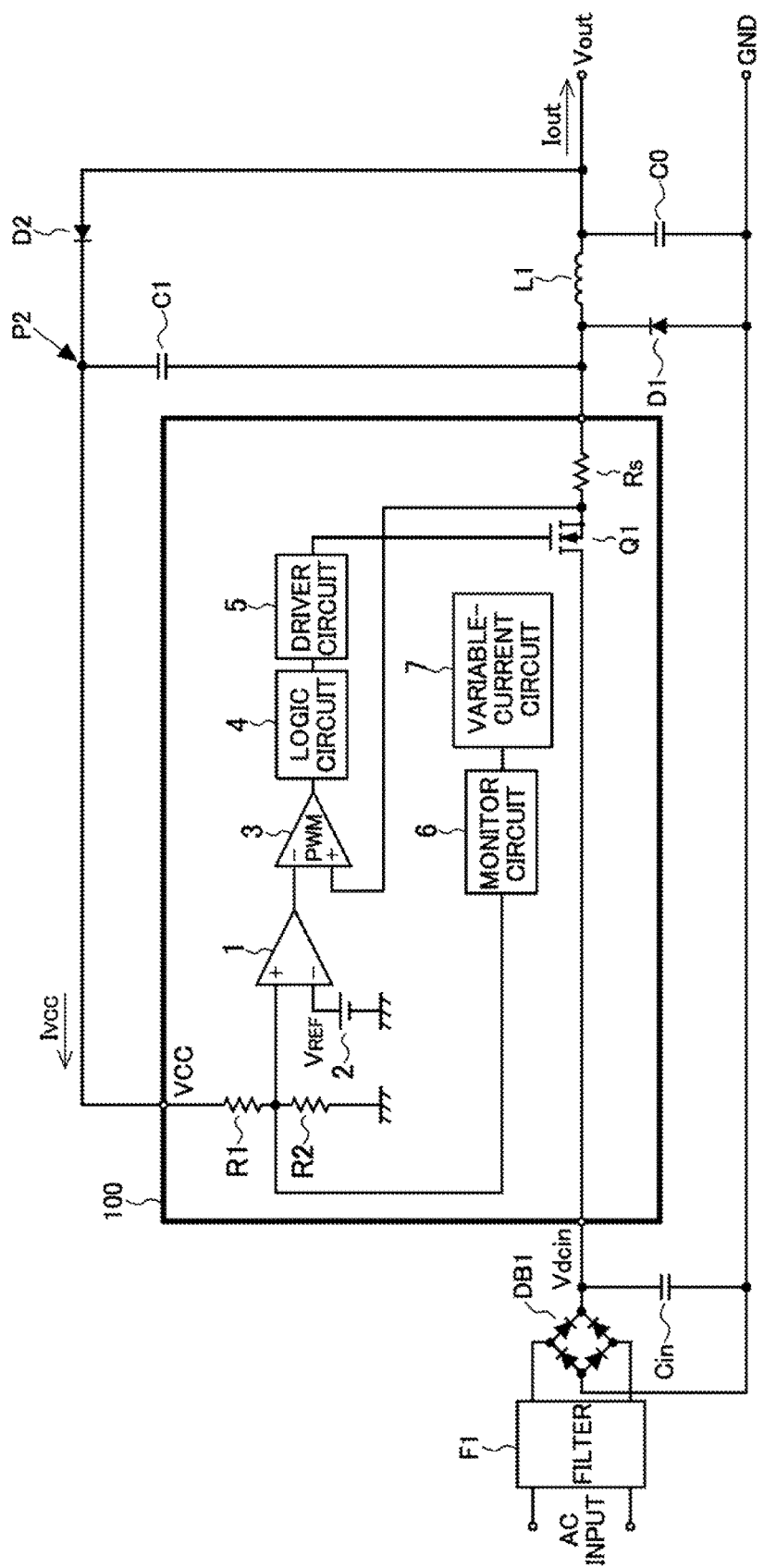
FIG. 1C is a diagram showing a modified example of the switching regulator shown in FIG. 1A.

Although, in the switching regulator shown in FIG. 1A, the monitor circuit 6 monitors the error signal fed out from the error amplifier 1, owing to the correlation between the error signal and the voltage VCC, it is also possible to adopt the configuration shown in FIG. 1B, that is, a configuration in which the monitor circuit 6 monitors the voltage VCC, or the configuration shown in FIG. 1C, that is, a configuration in which the monitor circuit 6 monitors a division voltage of the voltage VCC. Although, in the switching regulator shown in FIG. 1A, the current that flows through the inductor L1 when the NMOS transistor Q1 is ON is detected by the current detection resistor Rs, it is also possible to adopt a configuration in which no current detection resistor Rs is provided and in which the drain-source voltage of the NMOS transistor Q1 (a voltage drop due to the ON resistance of the NMOS transistor Q1) is monitored.

Although, in the switching regulator shown in FIG. 7, the current detector (the current detection resistor Rs) that detects the current flowing, through the inductor L1 is provided between the NMOS transistor Q1 and the diode D1, it may instead be provided between, at one end, the NMOS transistor Q1 and the diode D1 and, at the other end, the inductor L1.

Although an air conditioner has been taken as an application example of the switching regulators shown in FIGS. 1A and 7, the switching regulators shown in FIGS. 1A and 7 is applicable also to other electric appliances such as washing machines and refrigerators.

As will be seen from the above, it should be understood that the embodiments disclosed herein are in every aspect illustrative and not restrictive. The technical scope of the present invention is defined not by the description of embodiments given above but by the appended claims, and should be understood to encompass many modifications and variations made in the sense and scope equivalent to those of the claims.

Synopsis

According to one aspect of what is disclosed herein, a switching regulator includes: a switching device; a rectifying device having the anode thereof connected to an output terminal from which an output voltage is output; and a controller which uses the cathode voltage of the rectifying device as a supply voltage and which turns ON and OFF the switching device according to the cathode voltage of the rectifying device. The controller includes an error amplifier configured to produce an error signal commensurate with the difference between a voltage commensurate with the cathode voltage of the rectifying device and a reference voltage. The switching regulator further includes: a monitor configured to monitor the error signal; and a current varier configured to increase, based on the result of monitoring by the monitor, the current that flows through the rectifying device with increase in the error signal (a first configuration).

According to another aspect of what is disclosed herein, a switching regulator includes: a switching device; a rectifying device having the anode thereof connected to an output terminal from which an output voltage is output; and a controller which uses the cathode voltage of the rectifying device as a supply voltage and which turns ON and OFF the switching device according to the cathode voltage of the rectifying device. The controller includes an error amplifier configured to produce an error signal commensurate with the difference between a voltage commensurate with the cathode voltage of the rectifying device and a reference voltage. The switching regulator further includes: a monitor configured to monitor the cathode voltage of the rectifying device; and a current varier configured to increase, based on the result of monitoring by the monitor, the current that flows through the rectifying device with increase in the cathode voltage of the rectifying device (a second configuration).

According to yet another aspect of what is disclosed herein, a switching regulator includes a switching device; a rectifying device having the anode thereof connected to an output terminal from which an output voltage is output; and a controller which uses the cathode voltage of the rectifying device as a supply voltage and which turns ON and OFF the switching device according to the cathode voltage of the rectifying device. The controller includes a voltage divider configured to divide the cathode voltage of the rectifying device and an error amplifier configured to produce an error signal commensurate with the difference between a division voltage, which is fed out from the voltage divider, of the cathode voltage of the rectifying device and a reference voltage. The switching regulator further includes: a monitor configured to monitor the division voltage, which is fed out from the voltage divider, of the cathode voltage of the rectifying device; and a current varier configured to increase, based on the result of monitoring by the monitor, the current that flows through the rectifying device with increase in the division voltage of the cathode voltage of the rectifying device (a third configuration).

In the switching regulator according to any one of the first to third configurations described above, the switching device may be an NMOS transistor (a fourth configuration).

In the switching regulator according to any one of the first to fourth configurations described above, there may be provided a capacitor connected to the cathode of the rectifying device to stabilize the cathode voltage of the rectifying device (a fifth configuration).

In the switching regulator according to an one of the first to fifth configurations described above, the monitor and the current varier may include a voltage-current conversion circuit configured to receive an analog voltage signal (a sixth configuration).

In the switching regulator according to any one of the first to fifth configurations described above, the monitor and the current varier may include an A/D converter configured to convert an analog voltage signal into a digital voltage signal and a variable resistor arranged to vary its resistance value according to an output signal of the A/D converter (a seventh configuration).

According to one aspect of what is disclosed herein, an electric appliance includes the switching regulator of any one of the first to seventh configurations described above (an eighth configuration).

According to yet another aspect of what is disclosed herein, a switching regulator includes: a switching device; a rectifying device having the anode thereof connected to an output terminal from which an output voltage is output; an inductor arranged between the switching device and the output terminal; and a controller which uses the cathode voltage of the rectifying device as a supply voltage and which turns ON and OFF the switching device according to the cathode voltage of the rectifying device. The controller includes an error amplifier configured to produce an error signal commensurate with the difference between a voltage commensurate with the cathode voltage of the rectifying device and a reference voltage. The switching regulator further includes: a monitor configured to monitor a current that flows through the inductor; and a current varier configured to increase, based on the result of monitoring by the monitor, a current that flows through the rectifying device with increase in the current flowing through the inductor (a ninth configuration).

In the switching regulator according to the ninth configuration described above, the switching device may be an NMOS transistor (a tenth configuration).

In the switching regulator according to the ninth or tenth configuration described above, there may be provided a capacitor connected to the cathode of the rectifying device to stabilize the cathode voltage of the rectifying device (an eleventh configuration).

In the switching regulator according to any one of the ninth to eleventh configurations described above, there may further be provided a current detector configured to detect the current that flows through the inductor, and the monitor may receive the result of detection by the current detector (a twelfth configuration).

In the switching regulator according to the twelfth configuration described above, the current detector may detect only the current that flows through the inductor when the switching device is ON (a thirteenth configuration).

In the switching regulator according to the twelfth configuration described above, the current detector may detect the current that flows through the inductor when the switching device is ON and the current that flows through the inductor when the switching device is OFF (a fourteenth configuration).

In the switching regulator according to any one of the twelfth to fourteenth configurations described above, the monitor and the current varier may include an averager which averages the result of detection by the current detector and a voltage-current conversion circuit configured to receive an analog voltage signal fed out from the averager (a fifteenth configuration).

In the switching regulator according to any one of the twelfth to fourteenth configurations described above, the monitor and the current varier may include a sampler which samples the result of detection by the current detector with a predetermined sampling period and a voltage-current circuit configured to receive an analogue voltage signal fed out from the sampler (a sixteenth configuration).

In the switching regulator according to any one of the twelfth to fourteenth configurations described above, the monitor and the current varier may include an A/D converter configured to convert the result of detection by the current detector into a digital voltage signal with a sampling period synchronized with the switching period of the switching device and a variable resistor arranged to vary its resistance value according to an output signal of the A/D converter (a seventeenth configuration).

According to another aspect of what is disclosed herein, an electric appliance includes the switching regulator according to any one of the ninth to seventeenth configurations described above (an eighteenth configuration).

INDUSTRIAL APPLICABILITY

The present invention finds application in switching regulators used in various fields the fields of home electric appliances, automobiles, industrial machines, etc.).

What is claimed is:
1. A switching regulator, comprising:
a switching device;
a rectifying device having an anode thereof connected to an output terminal from which an output voltage is output;
an inductor arranged between the switching device and the output terminal;
a controller including an error amplifier configured to produce an error signal commensurate with a difference between a voltage commensurate with a cathode voltage of the rectifying device and a reference voltage, the controller using the cathode voltage of the rectifying device as a supply voltage, the controller turning ON and OFF the switching device according to the cathode voltage of the rectifying device;

a monitor configured to monitor a current that flows through the inductor; and a current varier configured to increase, based on a result of monitoring by the monitor, a current that flows through the rectifying device with increase in the current flowing through the inductor.

2. The switching regulator of claim 1, wherein the switching device is an NMOS transistor.

3. The switching regulator of claim 1, further comprising a capacitor connected to a cathode of the rectifying device to stabilize the cathode voltage of the rectifying device.

4. The switching regulator of claim 1, further comprising a current detector configured to detect the current that flows through the inductor, wherein the monitor receives a result of detection by the current detector.

5. The switching regulator of claim 4, wherein the current detector detects only the current that flows through the inductor when the switching device is ON.

6. The switching regulator of claim 4, wherein the current detector detects the current that flows through the inductor when the switching device is ON and the current that flows through the inductor when the switching device is OFF.

7. The switching regulator of claim 4, wherein the monitor and the current varier include an averager configured to average the result of detection by the current detector and a voltage-current conversion circuit configured to receive an analog voltage signal fed out from the averager.

8. The switching regulator of claim 4, wherein the monitor and the current varier include a sampler configured to sample the result of detection by the current detector with a predetermined sampling period and a voltage-current conversion circuit configured to receive an analog voltage signal fed out from the sampler.

9. The switching regulator of claim 4, wherein the monitor and the current varier include an A/D converter configured to convert the result of detection by the current detector into a digital voltage signal with a sampling period synchronized with a switching period of the switching device and a variable resistor arranged to vary a resistance value thereof according to an output signal of the A/D converter.

10. An electric appliance comprising the switching regulator of claim 1.

* * * * *